UNITED STATES PATENT OFFICE.

JOHN G. JARVIS, OF ADAMS, MASSACHUSETTS, ASSIGNOR TO THE AMERICAN ZYLONITE COMPANY, OF NEW YORK, N. Y.

MANUFACTURE OF ZYLONITE AND OTHER PYROXYLINE COMPOUNDS AND ARTICLES MADE THEREFROM.

SPECIFICATION forming part of Letters Patent No. 342,208, dated May 18, 1886.

Application filed January 9, 1886. Serial No. 188,130. (Specimens.)

*To all whom it may concern:*

Be it known that I, JOHN G. JARVIS, a citizen of the United States, residing at Adams, in the county of Berkshire and State of Massachusetts, have invented new and useful Improvements in Manufacture of Zylonite and other Pyroxyline Compounds, of which the following is a specification.

My invention relates to the manufacture of billiard-balls and other articles from zylonite or other pyroxyline compounds; and the purpose thereof is to provide a compound having a pyroxyline base which shall possess the requisite specific gravity and color of natural or virgin ivory, together with the toughness, homogeneity, and resiliency which is especially desirable in balls used upon billiard and pool tables.

The invention consists in the novel method of procedure hereinafter fully described, and definitely pointed out in the claims annexed to this specification. I take zylonite or other pyroxyline compound having mingled therewith the pigments necessary to impart the white body-color and the yellowish surface-tint peculiar to ivory, oxide of zinc and chrome-yellow being adapted to this purpose. Bone-dust is also added to the compound, in the usual manner, to impart the necessary gravity, the usual and well-known method being to mingle the zylonite or other pyroxyline compound, the bone-dust, and the proper pigments thoroughly together and adding spirits of camphor and placing it in an air-tight receptacle, where it is allowed to remain for twenty-four hours or more. It is then subjected to the action of mixing or converting rolls, which are acted upon alternately by heating and cooling agents, and by these rolls the substance is converted into a homogeneous mass. It is then put in a drying-house and allowed to season, during which time the greater part of the alcohol passes off with part of the camphor. After seasoning for a suitable period—from thirty to sixty days—it is taken out and pulverized, a part being reduced to fine dust or impalpable powder, and some to the condition of coarse particles, flat or cubical in shape, and about one-sixteenth of an inch in diameter. The compound having been prepared in the manner set forth, I take any solvent of camphor which is not a solvent of pyroxyline—such as coal-tar, naphtha, or any hydrocarbon—taking one part, by weight, of camphor to one hundred parts, by weight, of manufactured material, and, having dissolved the camphor in this solvent, I mingle with the solution the pulverized and comminuted compound described. The camphor being in solution and the latter being thoroughly mingled with the fine dust and the coarser particles of the pyroxyline compound, said solution surrounds each particle and completely envelops the same with a liquid holding camphor in solution, whereby, upon the naphtha or other hydrocarbon solvent being driven off by heat or otherwise, a thin film of camphor-gum is left perfectly distributed throughout the mass and enveloping each minute particle thereof. When the hydrocarbon solvent has been eliminated, I subject the mass to the action of hot vapor of alcohol, and thereafter subject it to a high heat and great pressure, whereby it is brought into the proper shape and condition to be turned in a lathe and stained upon the surface, and finally polished by buffing, like other balls, whether of ivory or composition.

I do not confine myself to the exact proportions of camphor mentioned herein, as I may use more or less than one part thereof to each one hundred parts of the manufactured material, as the circumstances of the case may require. Neither do I consider it absolutely necessary to subject the mass to heated alcoholic vapor after driving off the hydrocarbon solvent, as good results may be obtained without including this step in the process.

By my invention I obtain a composition suitable for the manufacture of billiard-balls and other articles which has substantially the luster, specific gravity, toughness, elasticity, and homogeneity of the best natural ivory.

Having thus described my invention, what I claim is—

1. In the manufacture of compositions containing zylonite or other compounds of pyroxyline, the process herein set forth of preparing the same, consisting in making a solution of camphor in any solvent which is not a solvent of pyroxyline, and mixing said solution with the pulverized and comminuted seasoned pyroxyline material, substantially as described.

2. In the manufacture of compositions containing zylonite or other compositions of pyroxyline, the process herein set forth, consisting in treating the seasoned pulverized and comminuted pyroxyline compound with a solution of camphor the solvent whereof is not a solvent of pyroxyline, and then eliminating the solvent of the camphor from the mass, substantially as described.

3. In the manufacture of compositions containing zylonite or other compositions of pyroxyline, the process herein set forth, consisting in treating the seasoned pulverized and comminuted pyroxyline compound with a solution of camphor the solvent of which is not a solvent of pyroxyline, driving off said solvent, and finally subjecting the mass to the action of heated alcoholic vapor, substantially as described.

4. The process herein described of manufacturing compositions containing zylonite or other pyroxyline compounds, which consists in grinding seasoned pyroxyline material into fine particles, enveloping each individual particle with a film of a solution of camphor the solvent whereof is not a solvent of pyroxyline, and eliminating the solvent of the camphor, as and for the purpose set forth.

In testimony whereof I affix my signature in presence of two witnesses.

JOHN G. JARVIS.

Witnesses:
  F. J. JONES,
  H. H. SCHÜRMANN.